US006728612B1

(12) United States Patent
Carver et al.

(10) Patent No.: US 6,728,612 B1
(45) Date of Patent: Apr. 27, 2004

(54) AUTOMATED TELEMATICS TEST SYSTEM AND METHOD

(75) Inventors: Howard J. Carver, Troy, MI (US); Richard F. Heines, Ortonville, MI (US); Qiong Liang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/330,916

(22) Filed: Dec. 27, 2002

(51) Int. Cl.⁷ ............................................. G01M 17/00
(52) U.S. Cl. .............................. 701/33; 701/36; 701/34
(58) Field of Search ........................... 701/1, 2, 29, 31, 701/33, 34, 36; 340/903, 435, 439, 539, 438, 440, 441; 180/167, 169; 342/69, 70, 72, 357.09

(56) References Cited

U.S. PATENT DOCUMENTS

| | | | | |
|---|---|---|---|---|
| 5,850,209 A | * | 12/1998 | Lemke et al. ................. | 701/33 |
| 6,275,231 B1 | * | 8/2001 | Obradovich ................. | 701/36 |
| 6,289,332 B2 | * | 9/2001 | Menig et al. ................. | 701/31 |
| 6,330,499 B1 | | 12/2001 | Chou et al. | |
| 6,542,794 B2 | * | 4/2003 | Obradovich ................... | 701/1 |
| 6,604,033 B1 | | 8/2003 | Banet et al. | |
| 6,611,740 B2 | | 8/2003 | Lowrey et al. | |

\* cited by examiner

*Primary Examiner*—Richard M. Camby
(74) *Attorney, Agent, or Firm*—Anthony Luke Simon

(57) ABSTRACT

The invention provides a method of and system for testing a telematics system in a mobile vehicle, which begin with sending at least one test command from a test center to a call center based on a test script. A test command is transmitted from the call center to the telematics unit. The test command is executed at the telematics unit and then a test response is sent from the telematics unit to the call center. Another aspect of the invention provides a computer usable medium that includes a program for testing a telematics system in a mobile vehicle.

23 Claims, 4 Drawing Sheets

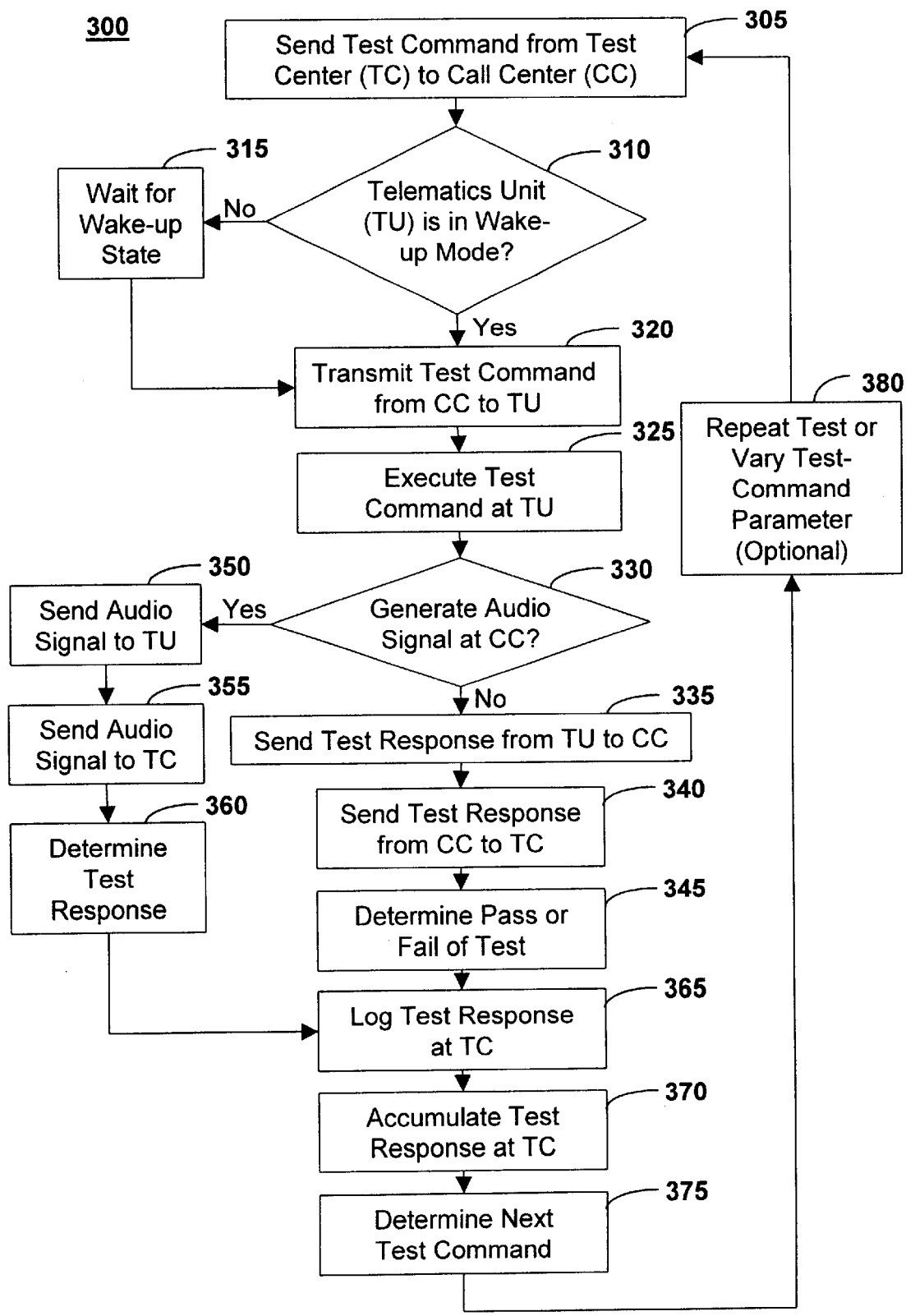

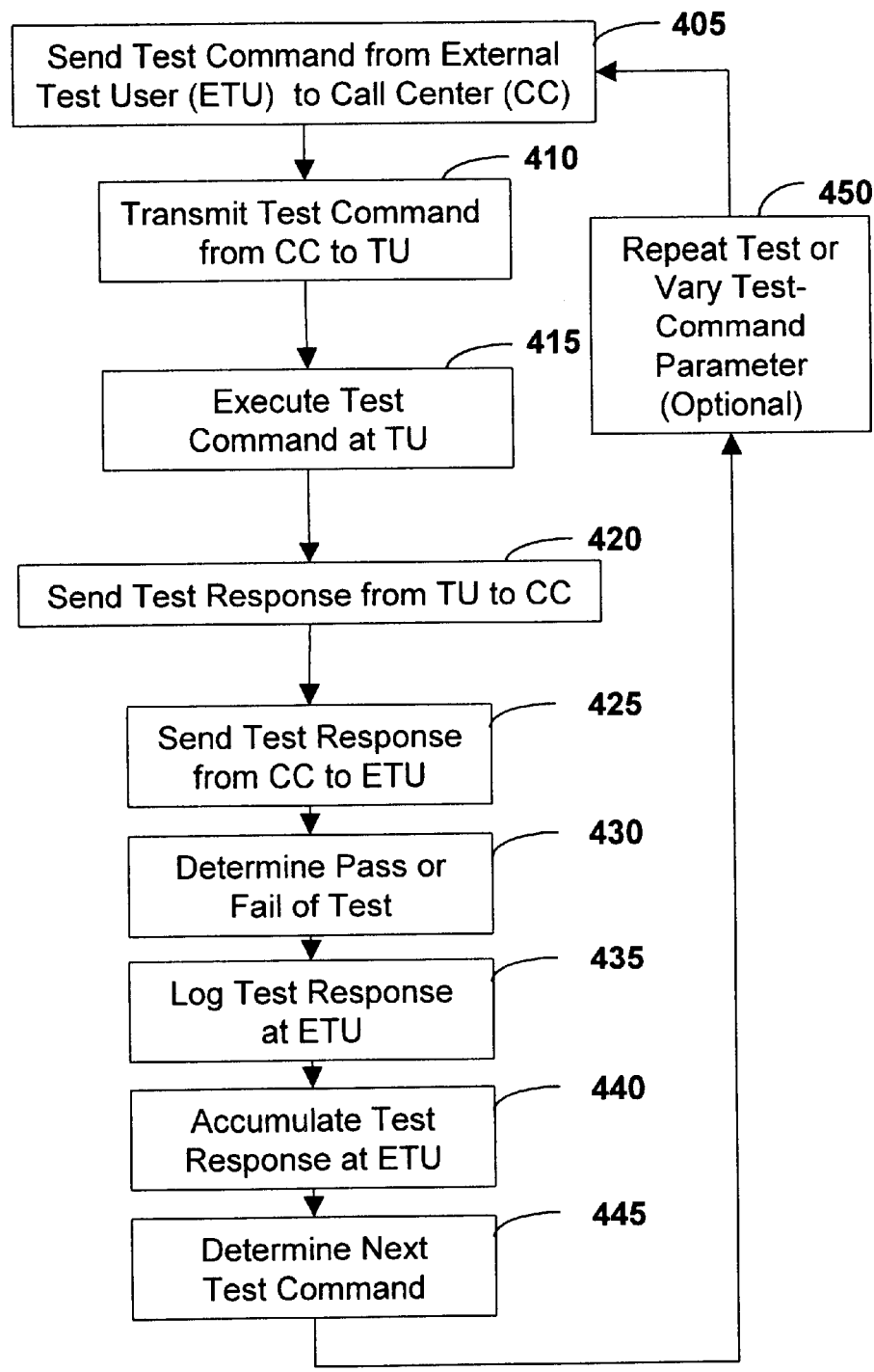

AUTOMATED TELEMATICS TEST SYSTEM AND METHOD

FIELD OF THE INVENTION

This invention relates generally to data transmissions over a wireless communication system. More specifically, the invention relates to a system and method for automated testing of an in-vehicle telematics unit.

BACKGROUND OF THE INVENTION

One of the fastest growing areas of communications technology is related to automobile network solutions. The demands and potential for wireless vehicle communication, networking and diagnostic services have escalated in recent years, with projections that by 2006 almost all new American cars will have some level of telematics service. Although many vehicles on the road today have limited wireless communication functions, such as unlocking a door and setting or disabling a car alarm, new vehicles offer additional wireless communication systems that help personalize comfort settings, run maintenance and diagnostic functions, place telephone calls, access call-center information, update controller systems, determine vehicle location and present other vehicle-related services. Newer vehicles are equipped with more customizable vehicle settings and services that are available to the driver inside and outside of the vehicle. Drivers can call telematics call centers to receive navigational, concierge, emergency, and location services, as well as other specialized help such as locating the geographical position of a vehicle when it has been stolen and honking the horn of a vehicle when it cannot be located in a large parking garage.

As the vehicle communication and electronic systems continue to expand, so do the complexity of, and need for, reliable and accurate testing system, method and software tools to test the functionality and performance of vehicle communication components, network connections, and telematics services. Most current testing of vehicle communications does not incorporate a real call center and actual wireless network environment. Self-contained laboratory testing works well for checking the performance of internal vehicle communication among the various communication and electronic modules that are connected via bus interfaces. Yet testing needs to go beyond bench-top systems that check the performance of internal vehicle communication software and related telematics hardware such as audio equipment, telematics units, cell-phone connections, Bluetooth wireless connections, infra-red data connections (IRDa), global positioning systems, radio frequency outputs, and input/output from electronic control modules. These systems cannot represent or simulate the numerous and complicated interactions among automobile communication modules, in-vehicle telematics units, wireless communication networks, and telematics call centers. Although the current test systems can certify an over the air-interface functionality of a wireless communication system, they do not use the same software or telephony as a call center and cannot verify call center capability of the system. To effectively test the multiplicities of network interactions between a vehicle and telematics service call center through various wired and wireless networks, a structured testing method and system should incorporate actual, real-time components of network and calling center infrastructure. It should also handle a high volume of simultaneous end-to-end unattended and automated testing of multiple in-vehicle wireless communication systems.

A desirable test system emulates communication among various components of the in-vehicle communication system, as well as network connections and services of telematics call centers and wireless carriers. The test system capability also would be available at remote facilities separate from the telematics service call center through an Internet-enabled network, allowing for end-to-end certification testing of hardware and software used in an in-vehicle wireless communication system. The testing system would allow remote test users to access, start, stop and monitor tests that are administered by the call center.

This testing system and method needs to be available during development as well as normal operation of a wireless communication system in a vehicle. As the traffic in automotive communication networks becomes more congested, testing for fault tolerance and fail-safe operation of both hardware and application software using all parts of the telecommunications infrastructure becomes even more critical. An effective automated test system and method would shorten development cycles and reduce development costs for manufacturers of wireless communication equipment for vehicles and for providers of wireless communication services. The automated test system would offer and maintain test scripts for internal or external usage.

It is an object of this invention, therefore, to provide an automated system and method to test a telematics system of a mobile vehicle in realistic situations and conditions using the infrastructure of a communications network, call center and test center, and to overcome the challenges and obstacles described above.

SUMMARY OF THE INVENTION

The present invention provides a method of and system for testing a telematics system in a mobile vehicle, which begin with sending at least one test command to a call center based on the test script. One or more test commands may be sent from a test center to the call center or alternatively, may be sent from an external test user via a web portal. The test command is transmitted from the call center to a telematics unit. The test command is executed at the telematics unit, a test response is sent from the telematics unit to the call center, and then the test response is sent from the call center to the test center where it may be logged and accumulated at the test center. Another aspect of the invention provides a computer usable medium that includes a program for testing a telematics system in a mobile vehicle.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 3 is a flow diagram of one embodiment of an automated method for testing a telematics system in a mobile vehicle, in accordance with the current invention; and FIG. 4 is a diagram of another embodiment of an automated method for testing a telematics system in a mobile vehicle, in accordance with the current invention.

DETAILED DESCRIPTION OF THE PRESENTLY PREFERRED EMBODIMENTS

Figure 1:
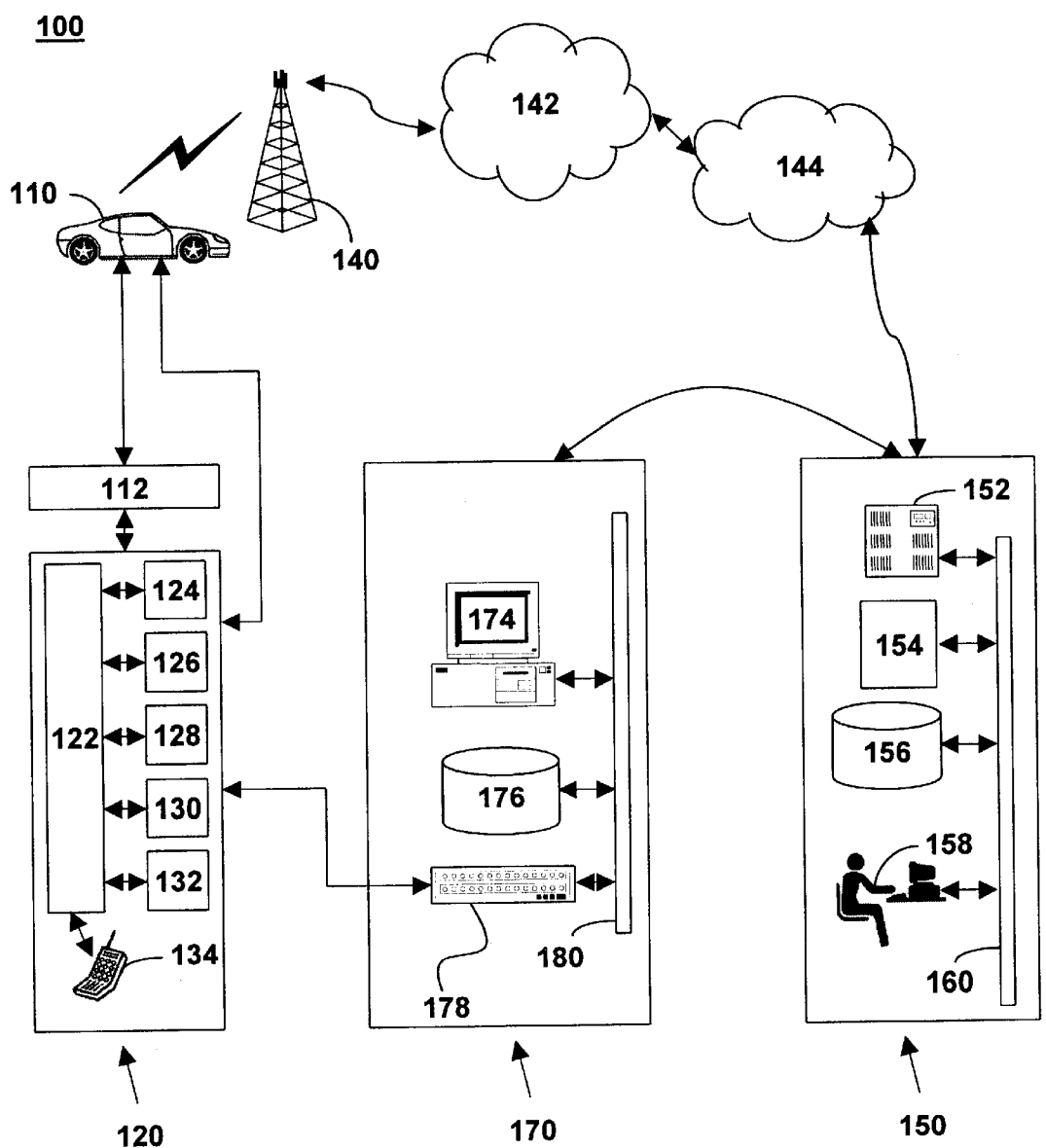
FIG. 1 illustrates one embodiment of an automated system for testing a telematics system in a mobile vehicle, in accordance with the current invention.

FIG. 1 illustrates one embodiment of system for testing a telematics system in a mobile vehicle, in accordance with the present invention at 100. The automated system and method for testing a telematics system employ wireless communications between a test center and an in-vehicle telematics unit. This embodiment of a telematics test system leverages the infrastructure of a vehicle communication bus, telematics unit, wireless and landline networks, telematics call center and test center to enable the test. The automated telematics test unit at the test center controls cycles of testing, communicating to and from an in-vehicle telematics unit with data and voice transmissions. The test system performs automated end-to-end testing between a vehicle and a telematics service call center, and can issue any number of test commands in varying order and with different combinations of test parameters or perform repeated testing.

The test system provides a method of exercising various segments of a voice or data cellular network and termination points in an automated and repeatable manner. The test system is a platform to conduct tests on pre-production and in-production telematics units, as well as new proof-of-concept units for new telematics services or equipment. The automated telematics test system expands test coverage and reduces the time, particularly human hours, required to fully validate telematics units when compared to the coverage and required test time of currently available test systems. By using an actual call center, rather than a call-center simulator and a cable hookup, the test system provides significantly more accurate results by implementing the physical telephony, data transmission algorithm implementation and call-transfer algorithms required of actual communications between a telematics unit and call center. This test system can provide valid certification testing of wireless communication systems in a mobile vehicle.

Automated telematics test system 100 includes a mobile vehicle 110, a telematics unit 120, a vehicle communication bus 112, one or more wireless carrier systems 140, one or more communication networks 142, one or more land networks 144, one or more call centers 150, and one or more test centers 170. Mobile vehicle 110 may be a mobile vehicle equipped with suitable hardware and software for transmitting and receiving voice and data communications.

Telematics unit 120 may include a digital signal processor (DSP) 122 connected to a wireless modem 124, a global positioning system (GPS) unit 126, an in-vehicle memory 128, a microphone 130, one or more speakers 132, and an embedded or in-vehicle mobile phone 134. DSP 122 may also be referred to as a microcontroller, controller, host processor, or vehicle communications processor. GPS unit 126 may provide longitude and latitude coordinates of the vehicle. In-vehicle mobile phone 134 may be an analog, digital, dual-mode, dual-band, multi-mode or multi-band cellular phone.

DSP 122 may execute various computer programs that control programming and operational modes of electronic and mechanical systems within mobile vehicle 110. DSP 122 may control communications between telematics unit 120, wireless carrier system 140, and call center 150. A voice-recognition application may be installed in DSP 122 that can translate human voice input through microphone 130 to digital signals. DSP 122 may generate and accept digital signals transmitted between telematics unit 120 and a vehicle communication bus 112 that is connected to various electronic modules in the vehicle. These digital signals may activate the programming mode and operation modes, as well as provide for data transfers. Signals from DSP 122 may be translated into voice messages and sent out through speaker 132.

Mobile vehicle 110 via a vehicle communication bus 112 may send signals to various units of equipment and systems within mobile vehicle 110 to perform various functions such as unlocking a door, opening the trunk, setting personal comfort settings, and calling from telematics unit 120. In facilitating interactions among the various communication and electronic modules, vehicle communication bus 112 may use bus interfaces such as controller-area network (CAN), International Organization for Standardization (ISO) Standard 9141, ISO Standard 11898 for high-speed applications, and ISO Standard 11519 for lower speed applications.

Mobile vehicle 110 via telematics unit 120 may send and receive radio transmissions from wireless carrier system 140. Wireless carrier system 140 may be any suitable system for transmitting a signal from mobile vehicle 110 to communication network 142.

Communication network 142 may comprise services from one or more mobile telephone switching offices and wireless networks. Communication network 142 may connect wireless carrier system 140 to land network 144. Communication network 142 may be any suitable system or collection of systems for connecting wireless carrier system 140 to mobile vehicle 110 and land network 144.

Land network 144 is a public-switched telephone network. Land network 144 may be an Internet protocol (IP) network. Land network 144 may be comprised of a wired network, an optical network, a fiber network, another wireless network, or any combination thereof. Land network 144 is connected to one or more landline telephones. Land network 144 may connect communication network 142 to call center 150. Communication network 142 and land network 144 may connect wireless carrier system 140 to a communication node or call center 150.

Call center 150 may contain one or more voice and data switches 152, one or more communication services managers 154, one or more communication services databases 156, one or more communication services advisors 158, and one or more bus systems 160.

Call center 150 may be a location where many calls may be received and serviced at the same time, or where many calls may be sent at the same time. The call center may be a telematics call center, prescribing communications to and from telematics unit 120 in mobile vehicle 110. The call center may be a voice call center, providing verbal communications between an advisor in the call center and a subscriber in a mobile vehicle. The call center may contain each of these functions.

Call center 150 may contain one or more voice and data switches 152. Switch 152 may be connected to land network 144. Switch 152 may transmit voice or data transmissions from call center 150. Switch 152 also may receive voice or data transmissions from telematics unit 120 in mobile vehicle 110 through wireless carrier system 140, communication network 142, and land network 144. Switch 152 may receive from or send to one or more communication services managers 154 data transmissions via one or more bus systems 160. Communication services manager 154 may be any suitable hardware and software capable of providing requested communication services to telematics unit 120 in mobile vehicle 110. Communication services manager 154 may send to or receive from one or more communication services databases 156 data transmissions via bus system 160. Communication services manager 154 may send to or receive from one or more communication services advisors 158 data transmissions via bus system 160. Communication services database 156 may send to or receive from communication services advisor 158 data transmissions via bus system 160. Communication services advisor 158 may receive from or send to switch 152 voice or data transmissions.

Communication services manager 154 may provide one or more of a variety of services, including enrollment services, navigation assistance, vehicle personalization, vehicle data upload, vehicle data download, replenish subscriber minutes, unlock/lock vehicle, flash lights, honk horn, perform diagnostic functions and perform vehicle tracking functions. Communication services manager 154 may transmit data to telematics unit 120 in mobile vehicle 110 through wireless carrier system 140, communication network 142, land network 144, voice and data switch 152, and bus system 160. Communication services manager 154 may store or retrieve data and information from communication services database 156. Communication services manager 154 may provide requested information to communication services advisor 158.

Communication services advisor 158 may be a real advisor or a virtual advisor. A real advisor may be a human being in verbal communication with a user or subscriber in mobile vehicle 110 via telematics unit 120. A virtual advisor may be a synthesized voice interface responding to requests from telematics unit 120 in mobile vehicle 110. This virtual advisor may be a recorded message consisting of tones or a sequence of tones.

Communication services advisor 158 may provide services to telematics unit 120 in mobile vehicle 110. Services provided by communication services advisor 158 may include enrollment services, navigation assistance, real-time traffic advisories, directory assistance, roadside assistance, business or residential assistance, information services assistance, emergency assistance, and communications assistance. Communication services advisor 158 may communicate with telematics unit 120 in mobile vehicle 110 through wireless carrier system 140, communication network 142, and land network 144 using voice transmissions, or through communication services manager 154 and switch 152 using data transmissions.

Mobile vehicle 110 may initiate service request to call center 150 by sending a voice or digital-signal command to telematics unit 120, which in turn, sends an instructional signal or a voice call through wireless modem 124, wireless carrier system 140, communication network 142, and land network 144 to call center 150.

Test center 170 comprises one or more test system computers 174, one or more test system databases 176, a bus system 180 and one or more digital, analog and audio interfaces 178. Test center 170 may be connected directly by wire to call center 150.

Test system computer 174 receives digital or analog transmissions from telematics unit 120 in mobile vehicle 110 via wireless carrier system 140, communication network 142, land network 144, and call center 150. Test system computer 174 may be any suitable hardware and software capable of providing requested test commands to telematics unit 120 in mobile vehicle 110. Test system computer 174 may send to or receive from one or more test system databases 176 data transmissions via bus system 180. Test system computer 174 includes computer applications and files for managing and storing test scripts, commands and results. One or more test system computers 174 may be networked via bus system 180 to distribute the management and implementation of testing. Test system database 176, which may be a part of or a separate computer from test system computer 174, sends to or receives data from test applications in test system computer 174. Test system computer 174 sends data transmissions to call center 150 via local area network (LAN), wide area network (WAN), or dialup connectivity.

In one configuration of the test system, a mobile vehicle 110 that is located in a test center is attached to the test system with a digital, analog and audio interface 178. Digital, analog and audio interface 178, which may be connected by wire or cable to telematics unit 120 and bus system 180, allows test system computer 174 to initiate, log and accumulate a variety of test and communication routines between mobile vehicle 110 and call center 150.

Figure 2:
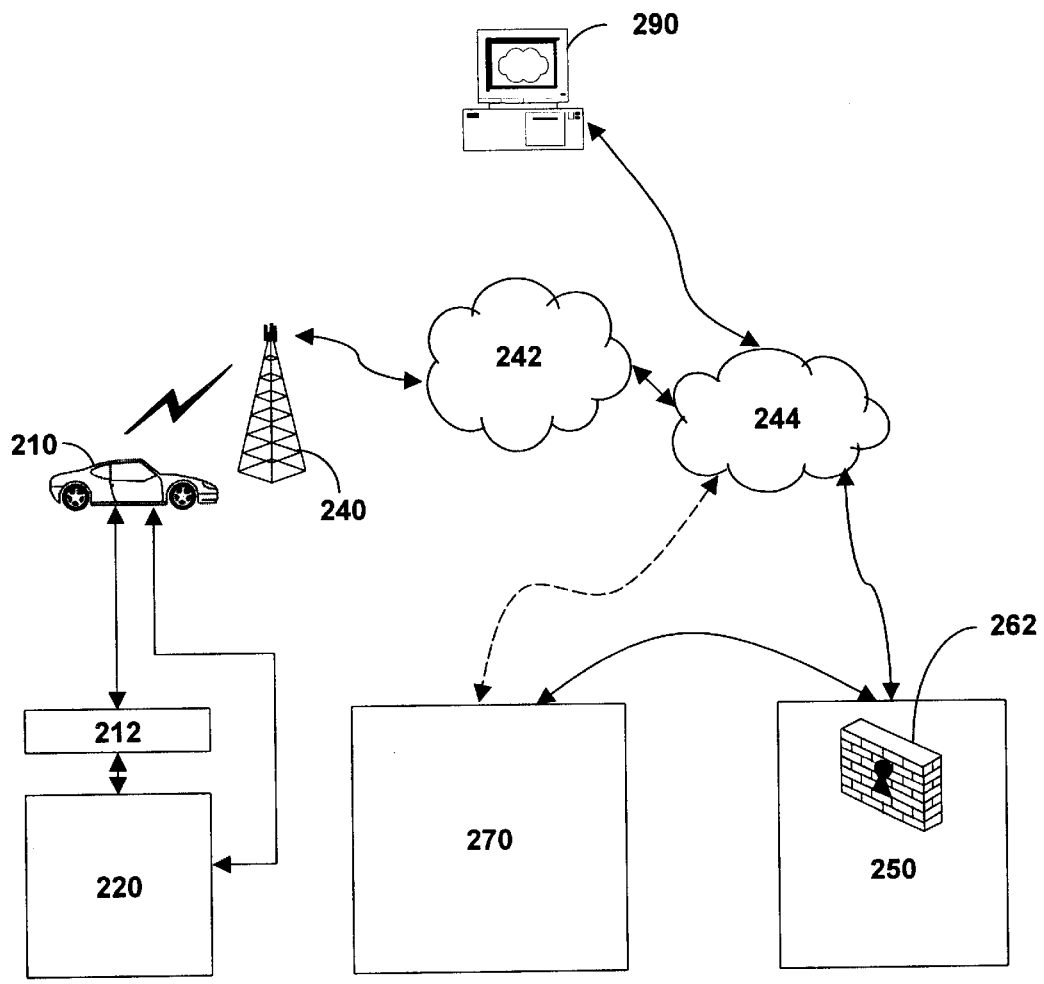
FIG. 2 illustrates another embodiment of an automated system for testing a telematics system in a mobile vehicle, in accordance with the current invention.

FIG. 2 illustrates another embodiment of a system for testing a telematics system in a mobile vehicle, in accordance with the present invention at 200. The automated test tool and system for testing a telematics system in FIG. 2 is similar to the system illustrated by FIG. 1, with the exception of an additional remote client or external test user that accesses the test system of a call center via an Internet-enabled network connection to the local area network (LAN) of the call center. This embodiment, like that of FIG. 1, leverages the infrastructure of a vehicle communication bus, telematics unit, wireless and landline networks, telematics call center and test center to enable the test.

Automated telematics test system 200 includes a mobile vehicle 210, a telematics unit 220, a vehicle communication bus 212, one or more wireless carrier systems 240, one or more communication networks 242, one or more land networks 244, one or more call centers 250, and one or more external test users 290. Mobile vehicle 210 may be a mobile vehicle equipped with suitable hardware and software for transmitting and receiving voice and data communications. Automated telematics test system 200 may include one or more test centers 270.

Mobile vehicle 210 via a vehicle communication bus 212 may send signals to various units of equipment and systems within mobile vehicle 210 to perform various functions such as unlocking a door, opening the trunk, setting personal comfort settings, and calling from telematics unit 220. Mobile vehicle 210 via telematics unit 220 may send and receive radio transmissions from wireless carrier system 240. Wireless carrier system 240 may be any suitable system for transmitting a signal from mobile vehicle 210 to communication network 242.

Communication network 242 may comprise services from one or more mobile telephone switching offices and wireless networks. Communication network 242 may connect wireless carrier system 240 to land network 244. Communication network 242 may be any suitable system or collection of systems for connecting wireless carrier system 240 to mobile vehicle 210 and land network 244.

Land network 244 is a public-switched telephone network that may be comprised of a wired network, an optical network, a fiber network, another wireless network, or any combination thereof. Land network 244 may connect communication network 242 to call center 250. Communication network 242 and land network 244 may connect wireless carrier system 240 to a communication node or call center 250.

Call center 250 is a location where many calls may be received and serviced at the same time, or where many calls may be sent at the same time. The call center may be a telematics service call center, prescribing communications to and from telematics unit 220 in mobile vehicle 210. The call center may be a voice call center, providing verbal communications between an advisor in the call center and a subscriber in a mobile vehicle. The call center may contain each of these functions.

Call center 250 may provide services to telematics unit 220 in mobile vehicle 210, such as enrollment services, navigation assistance, real-time traffic advisories, directory assistance, roadside assistance, business or residential assistance, information services assistance, emergency assistance, and communications assistance. Call center 250 may communicate with telematics unit 220 in mobile vehicle 210 through wireless carrier system 240, communication network 242, and land network 244 using voice or data transmissions. Call center 250 includes Internet security with software and hardware that provide a security firewall 262 between its LAN and any remote access via the Internet. Firewvall 262 is a security system to protect a networked server from intentional or accidental damage or unauthorized access that is implemented by hardware such as a dedicated gateway machine or router and software with defensive coding. Firewall 262 is used between the LAN and land network 244 to prevent security loopholes.

Mobile vehicle 210 may initiate a service request to call center 250 by ending a voice or digital-signal command to telematics unit 220 which in turn ends an instructional signal or a voice call wireless carrier system 240, communication network 242, and land network 244 to call center 250.

Test center 270 comprises any suitable hardware and software capable of providing requested test commands to telematics unit 220 in mobile vehicle 210. Test center 270 may be connected directly by wire to call center 250.

Test center 270 receives digital or analog transmissions from telematics unit 220 in mobile vehicle 210 via wireless carrier system 240, communication network 242, land network 244, and call center 250. Test center 270 sends data transmissions to call center 250 via local area network (LAN), wide area network (WAN), or dialup connectivity.

External test user 290 may be a thin client personal computer with Internet-enabled software that is able to access call center 250 via land network 244. External test user 290 is able to run automated testing on mobile vehicle 210 from a remotetest facility as if it were test center 270. External test user 290 may access the test tools of call center 250 via web browser software. The interface may be deployed as a thin client that allows the user to start, stop and monitor tests, while the test configurations and test results remain under the control of call center 250. The test scripts and software tools accessed by external test user 290 may employ Web applications such as Java Server Pages (JSP), Java Servlet, or the application programming interface of Enterprise JavaBeans (EJB).

FIG. 3 is a flow diagram of one embodiment for testing a telematics system in a mobile vehicle, in accordance with the present invention at 300. One embodiment of an automated method for testing an in-vehicle telematics system begins with sending a test command from a test center to a call center, as seen at block 305. A setup routine may be executed to connect the test system computer, also referred to as the test client, of the test center to the vehicle communications server and database of the call center. The test center may be in a separate facility and connected to the call center via wireless or landline networks, or may be in the same general location of the call center and connected to a local area network (LAN).

A test script, which becomes the basis for a test command sent to a vehicle, consists of one or more requests for telematics services, such as a request to send a "door unlock" command to an in-vehicle telematics unit. Test scripts, which may be stored in a test-center database for later retrieval, may comprise a plurality of serialized test commands. An example of a test command includes: lock/unlock door, light flash, honk horn and airbag check, with varied order and spacing of time in between each testing. Certain test commands, such as those related to phone configuration and programming may include one or more parameters that may be varied in a predetermined manner.

The test system computer executes the test setup routine that binds itself to an instance of the communications services manager and its associated database within the call center, and builds the necessary test request object before transmitting it to the call center. The call center receives and processes the test request of a test center in its communication services manager, also known as the telematics service manager or the vehicle communications application. The test center script contains information relating to the state of the telematics unit, whether the unit is in a powered-on state or in a powered-off or sleeping state. If the test center script states the unit is powered down, before transmitting a test command to the telematics unit, the communication services manager determines from information in its database whether the particular telematics unit is scheduled to be in a wake-up or powered-up mode, or whether it is in a powered-down or sleep mode, as seen at block 310. For example, a telematics unit in a turned-off vehicle may be powered down most of the time and wakened every ten minutes to check if there are any incoming messages from a wireless carrier or call center. The communication services manager may calculate the wake time based on information stored at the call center associated with the telematics unit under test. This may include the station and vehicle identification numbers associated with a particular vehicle.

When the vehicle is in a quiescent mode, the communication services manager may wait until the telematics unit awakens from its sleep or powered-down mode, as seen at block 315, and times its call so that the telematics unit is already powered up and has registered with the network when required. The call center then transmits the test command to the telematics unit based on the test script, as seen at block 320. Examples of test commands include lock a door, unlock a door, flash the lights, send global position system coordinates, check an airbag, transfer data, switch to voice communications mode, switch to data communications mode, send an identification number, configure a unit, add calling time, modify a parameter, enable a feature, disable a feature, perform a diagnostic function, perform a communications function, process a request, and perform a request.

In the case where the vehicle is in operation or the telematics unit is in its scheduled wake-up state, the test command may be sent without delay to the telematics unit, as seen at block 310 and block 320. The test command is part of a test script that may be sent by the test center to the call center, processed, and then relayed to the telematics unit.

Data authentication occurs between the telematics unit and the call center to ensure that the call request and test command are from the call center. Authentication may include, for example, a message sent back to the call center requiring authentication based on identification such as a telematics unit identification number, also referred to as a station identification number (STID). The call center, for example, may store authentication keys calculated from the telematics unit ID and other vehicle or user information and compare the keys with information sent from the telematics unit.

The test command message may be processed and initiated or executed at the telematics unit and one of the twenty or more electronic control modules in the vehicle that take action in response to the test command, as seen at block 325. The telematics unit sends back a test response, also referred to as an acknowledgment message, to the call center acknowledging the receipt and the initiation or execution of a test command, as seen at block 335.

After receiving the test response from the telematics unit, the call center sends a message to the telematics unit to disconnect the call and then the telematics unit disconnects the call. Meanwhile, the call center sends the test response to the test center, as seen at block 340, to relay back a report on the success or failure of the test execution by the telematics unit in the mobile vehicle. A determination may be made at the call center whether the test passed or failed, as seen at block 345, and then the test center logs the results of the test run in its database, as seen at block 365.

In an alternative configuration of the test system, a vehicle equipped with a telematics unit may be located in the test center, so that the responses of the telematics unit can be more directly controlled or measured. A digital, analog and audio interface may be wired between the test computer and the telematics unit. In this way, the test computer may locally monitor the initiation of a call from the call center as well as the direct response and action taken at the vehicle after receiving a test command. When the vehicle is located at the premises of the test center, the test center may check, for example, a honked horn, unlocked door, or flashed lights, and a meter can measure the solenoid movement or audio sounds from equipment.

The test center may generate a telematics request at the vehicle through a digital, analog and audio interface between the test system computer and the vehicle. The telematics request, for example, may be a signal simulating a key press of an emergency button on the in-vehicle telematics unit. The telematics request may be, for example, a key press for beginning communication with a telematics advisor at the call center. After the test command to switch to voice has been executed in the vehicle, as seen back at block 325, a virtual advisor may generate an audio signal from the call center, as seen at block 330. The generated audio signal may emulate, for example, the voice of a telematics advisor by use of a single tone or a sequence of tones. The generated audio signal may then be sent to the telematics unit, as seen at block 350. The telematics unit then relays the audio signal back to the test center, as seen at block 355. The test system computer determines the test response, as seen at block 360, based on the particular frequency, or sequence of tones generated at the calling center back in block 330. As with the test command responses sent back from the call center, a software application of the test system computer evaluates the test results and logs the test response, as seen at block 365. The result of the test may be accumulated with results from other test runs, as seen as block 370. The application may determine the next test command to be sent, as seen at block 375. Depending on the test script and test results, the computer application may decide whether to repeat the test or to vary one or more parameters in the next test command, as seen at block 380. It may send a subsequent test command to the call center based on the last test response or any previous responses of the telematics unit, as seen back at block 305.

These above mentioned steps and network interactions between a call initiated in a vehicle and the response of a telematics service call center may be repeated by sending out the test command again. The test command may be repeated a number of times during a predetermined time period. Each test command can have a number of parameters such as new call, awake state, time delay between tests, and timeouts with retries. A parameter associated with the test command may be varied by a predetermined amount each time the test command is repeated. Test commands may be configured to automatically increment a specific parameter for each test run over a specified range. For example, a test script may be incremented by one unit for 31 times, causing 32 test commands to be generated at run time from one test script in the test system database. Parameters may be varied automatically by configuring multiple test commands. Incremented parameters include, for example, personal call payment options, location history index, vehicle tracking durations, vehicle tracking frequencies, door lock/unlock activation times, activation time modifications, alert durations, phone identifications, and name indexes.

The particular embodiment of the invention when a vehicle with a telematics unit under test is located in the test center is beneficial for testing of, for example, a telematics unit placing 1000 emergency calls. The test system computer executes a test sequence, builds a first request and transmits it to the digital/analog/audio interface where the request is converted to an electrical signal that the telematics unit processes as an "emergency" key press, simulating a person pushing the emergency key of a telematics unit. The telematics unit places a call via the wireless and landline networks to the call center where the call center receives the emergency call at a phone number and modem designated for emergency calls. The telematics unit transmits its identification number with GPS coordinates and its call-state information, the call is switched from data to voice transmission mode, and then the telematics unit receives audible tones through the voice connection to the call center via a virtual advisor. Tone detector circuitry in the test center may detect the tones of a specific frequency that have been received by the digital, analog and audio interface and then log the activity in a database. The call is disconnected at the private switch of the call center.

Vehicle hardware may be tested separately and without repetitive tests in cases where hardware could be rendered inoperable, such as such as tests for telematics configuration, phone program set-up, and telephone number or mobile identification number (MIN) changes.

FIG. 4 is a diagram of another embodiment of an automated method for testing a telematics system in a mobile vehicle, in accordance with the current invention. An automated test method 400 of FIG. 4, like the test method illustrated in FIG. 3, provides the steps required to test a telematics system in a mobile vehicle. Automated test method 400 shows an external test user employing a thin client and web-browser applications to access, run, and monitor automatic testing that is controlled through a telematics service call center. In an alternative embodiment, the test user may access the testing applications from the test center, which is then connected to the network of the call center.

The automated method for testing an in-vehicle telematics system begins with a test command sent from an external test user via a web portal to a call center, as seen at block 405. A setup routine may be executed to connect the external test user to the call center by employing a web browser and a thin test client computer application. The application is Internet-enabled with some form of Web Service and Applications such as Java Server Pages (JSP), Java Servlet, or Enterprise JavaBeans (EJB). Other combinations of common gateway interface (CGI) or cross-platform programming may be used. The external test application accesses the vehicle communications server and database of the call center through the Internet after the user has been authenticated by a security application of server. Authentication may include using identification numbers, passwords, encryption, or any current security process to validate the identity of the user.

The external test user selects from a list of test commands with the web interface of the test application. For example, the user may select the command to flash lights from a pull-down menu of a web-based form. Other parameters such as duration of tests, number of repetitions, may be presented with web-form objects such as generalized buttons, radio buttons, checkboxes, text boxes, pull-down lists, scrolled lists, text controls or any other type of control or input object that may aid the user in the test selections.

An example of a test command includes lock/unlock door, light flash, honk horn and airbag check, with varied order and spacing of time in between each testing. Certain test commands, such as those related to phone configuration and programming may include one or more parameters that may be varied in a predetermined manner.

The computer of the external test user submits its selections for the test command, which is then bound to an instance of the communications services manager and its associated database within the call center where the necessary test request object is built. The call center receives and processes the test request of the external test user in its communication services manager, also known as the telematics service manager or the vehicle communications application.

The call center transmits the test command to the telematics unit based on the selected test command and associated parameters, as seen at block 410. Examples of test commands include lock a door, unlock a door, flash the lights, send global position system coordinates, check an airbag, transfer data, switch to voice communications mode, switch to data communications mode, send an identification number, configure a unit, add calling time, modify a parameter, enable a feature, disable a feature, perform a diagnostic function, perform a communications function, process a request, and perform a request.

Data authentication occurs between the telematics unit and the call center to ensure that the call request and test command are from the call center. Authentication may include, for example, a message sent back to the call center requiring authentication based on identification such as a telematics unit identification number, also referred to as a station identification number (STID). The call center, for example, may store authentication keys calculated from the telematics unit ID and other vehicle or user information and compare the keys with information sent from the telematics unit. Along with maintaining security, the call center can retain control over the testing, and more specifically, the test scripts, content, data and results.

The test command message may be processed and initiated or executed at the telematics unit and one of the twenty or more electronic control-modules in the vehicle that take action in response to the test command, as seen at block 415. The telematics unit sends back a test response, also referred to as an acknowledgment message, to the call center acknowledging the receipt and the initiation or execution of a test command, as seen at block 420.

After receiving the test response from the telematics unit, the call center sends a message to the telematics unit to disconnect the call and then the telematics unit disconnects the call. Meanwhile, the call center sends the test response to the external test user, as seen at block 425, to relay back a report on the success or failure of the test execution by the telematics unit in the mobile vehicle. A determination may be made at the call center whether the test passed or failed, as seen at block 430, and then the call center logs the results of the test run in its database, as seen at block 435. Alternatively, the test results may be evaluated and logged by a software application at the remote computer of the external test user.

The result of the test may be accumulated with results from other test runs, as seen as block 440. The external test user may determine the next test command to be sent, as seen at block 445. Depending on the test script and test results, the external test user may decide whether to repeat the test or to vary one or more parameters in the next test command, as seen at block 450. It may send a subsequent test command to the call center based on the last test response or any previous responses of the telematics unit, as seen back at block 405.

These abovementioned steps and network interactions between an external test user initiated in a vehicle and the response of a telematics service call center may be repeated by sending out the test command again. The test command may be repeated a number of times and parameters may be varied based on selections given through the web interface of the test application from the call center. Some parameters that may be varied include, for example, vehicle-tracking durations, vehicle tracking frequencies, door lock/unlock activation times, activation time modifications, alert durations, phone identifications, and name indexes.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of testing a telematics system in a mobile vehicle, comprising:
   sending at least one test command to a call center based on a test script;
   transmitting at least one test command from the call center to a telematics unit;
   executing the test command at the telematics unit; and
   sending a test response from the telematics unit to the call center.

2. The method of claim 1 wherein the at least one test command is sent from a test center to the call center.

3. The method of claim 1 wherein the at least one test command is sent from an external test user via a web portal.

4. The method of claim 1 wherein the test script comprises a plurality of serialized test commands.

5. The method of claim 1 wherein the test command is selected from the group consisting of lock a door, unlock a door, flash the lights, send global position system coordinates, check an airbag, transfer data, switch to voice, switch to data, send an identification number, configure a unit, add calling time, modify a parameter, enable a feature, disable a feature, perform a diagnostic function, perform a communications function, process a request, and perform a request.

6. The method of claim 1 further comprising:

sending the test response from the call center to one of a test center or an external test user; and logging the test response.

7. The method of claim 1 further comprising:

determining a pass or a fail based on the test response.

8. The method of claim 1 wherein the test response is accumulated.

9. The method of claim 1 wherein a subsequent test command is sent from one of a test center or an external test user based on the test response.

10. The method of claim 1 wherein the test command is repeated a plurality of times during a predetermined time period.

11. The method of claim 10 wherein a parameter associated with the test command is varied by a predetermined amount when the test command is repeated.

12. The method of claim 1 further comprising:

determining whether the telematics unit is in a wake-up mode; and transmitting the test command from the call center to the telematics unit based on the determination.

13. The method of claim 1 further comprising:

generating an audio signal at the call center based on the test command; and sending the audio signal from the call center to the telematics unit in response to the test command.

14. A computer usable medium including a program for testing a telematics system in a mobile vehicle, comprising:

computer program code to send at least one test command to a call center based on a test script;

computer program code to transmit at least one test command from the call center to a telematics unit;

computer program code to execute the test command at the telematics unit; and computer program code to send a test response from the telematics unit to the call center.

15. The computer usable medium of claim 14 further comprising:

computer program code to send the test response from the call center to one of a test center or an external test user; and computer program code to log the test response.

16. The computer usable medium of claim 14 further comprising:

computer program code to determine a pass or a fail based on the test response.

17. The computer usable medium of claim 14 further comprising:

computer program code to determine whether the telematics unit is in a wake-up mode; and computer program code to transmit the test command from the call center to the telematics unit based on the determination.

18. The computer usable medium of claim 14 further comprising:

computer program code to generate an audio signal at the call center based on the test command; and computer program code to send the audio signal from the call center to the telematics unit in response to the test command.

19. A system for testing a telematics system in a mobile vehicle, comprising:

means for sending at least one test command to a call center based on a test script;

means for transmitting at least one test command from the call center to a telematics unit;

means for executing the test command at the telematics unit; and means for sending a test response from the telematics unit to the call center.

20. The system of claim 19 further comprising:

means for sending the test response from the call center to one of a test center or an external test user; and means for logging the test response.

21. The system of claim 19 further comprising:

means for determining a pass or a fail based on the test response.

22. The system of claim 19 further comprising:

means for determining whether the telematics unit is in a wake-up mode; and means for transmitting the test command from the call center to the telematics unit based on the determination.

23. The system of claim 19 further comprising:

means for generating an audio signal at the call center based on the test command; and means for sending the audio signal from the call center to the telematics unit in response to the test command.

* * * * *